(12) United States Patent
Alves et al.

(10) Patent No.: US 6,672,452 B1
(45) Date of Patent: Jan. 6, 2004

(54) DVD STORAGE ALBUM

(75) Inventors: Kasidy W. Alves, Oxnard, CA (US); Joseph K. Garretson, Simi Valley, CA (US); Michael J. Massett, Moorpark, CA (US)

(73) Assignee: Scosche Industries, Inc., Oxnard, CA (US)

( * ) Notice: Subject to any disclaimer, the term of this patent is extended or adjusted under 35 U.S.C. 154(b) by 36 days.

(21) Appl. No.: 10/096,032

(22) Filed: Mar. 13, 2002

(51) Int. Cl.7 ............................................... B65D 69/00
(52) U.S. Cl. ..................... 206/232; 206/308.1; 206/472
(58) Field of Search ............................... 206/308.1, 312, 206/313, 472, 473, 232; 150/147; 281/31, 37, 38

(56) References Cited

U.S. PATENT DOCUMENTS

| | | | | | |
|---|---|---|---|---|---|
| 4,312,393 A | * | 1/1982 | Green | ........................... | 281/45 |
| 4,890,728 A | * | 1/1990 | Grimsley | ................... | 206/0.81 |
| D319,345 S | * | 8/1991 | Rayburn | ....................... | D6/630 |
| 5,407,067 A | * | 4/1995 | Cotter et al. | ................. | 206/312 |
| 5,590,827 A | | 1/1997 | Nimpoeno | | |
| 5,595,797 A | | 1/1997 | Miller | | |
| 5,595,798 A | | 1/1997 | Miller | | |
| D382,166 S | * | 8/1997 | Alves et al. | .................. | D6/634 |
| D434,439 S | * | 11/2000 | Coleman | ...................... | D19/27 |
| 6,267,234 B1 | * | 7/2001 | Bergh et al. | ............. | 206/308.1 |
| D465,087 S | * | 11/2002 | Shapiro | ........................ | D3/303 |

* cited by examiner

*Primary Examiner*—Shian Luong
(74) *Attorney, Agent, or Firm*—William W. Haefliger

(57) ABSTRACT

A DVD equipment holder comprising, in combination a backer layer having opposite sides; first overlapping DVD reception pockets located at one of the sides, and attached to a layer, whereby the pockets have accessible DVD entrances; and a first transparent plastic layer or layers located at one side of the backer layer and attached to the backer layer to form a first auxiliary pocket or pockets having an entrance or entrances, whereby a graphics sheet or sheets associated with one or more DVD's is or are receivable in an auxiliary pocket or pockets, and viewable through the first plastic layer or layers.

6 Claims, 4 Drawing Sheets

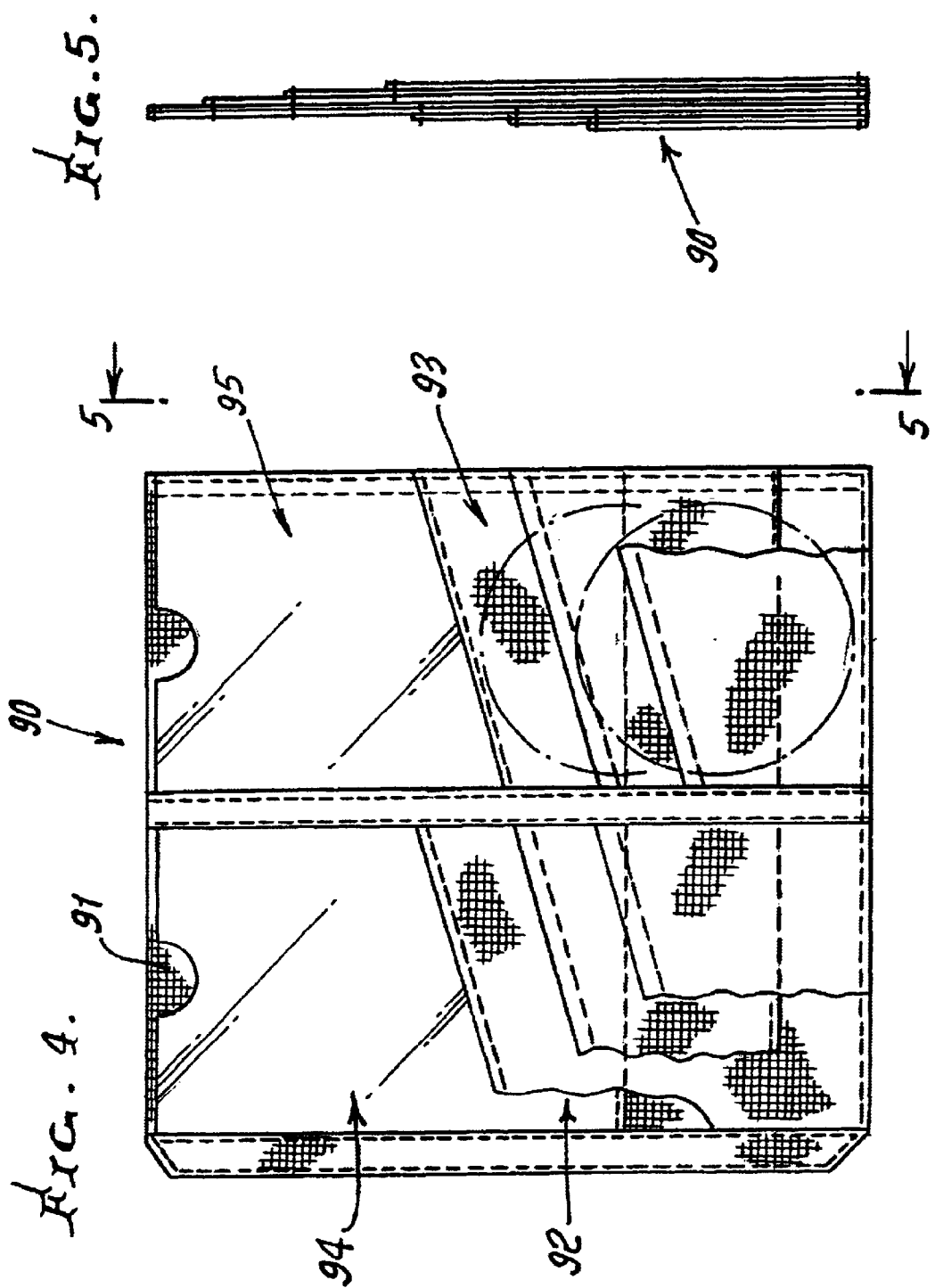

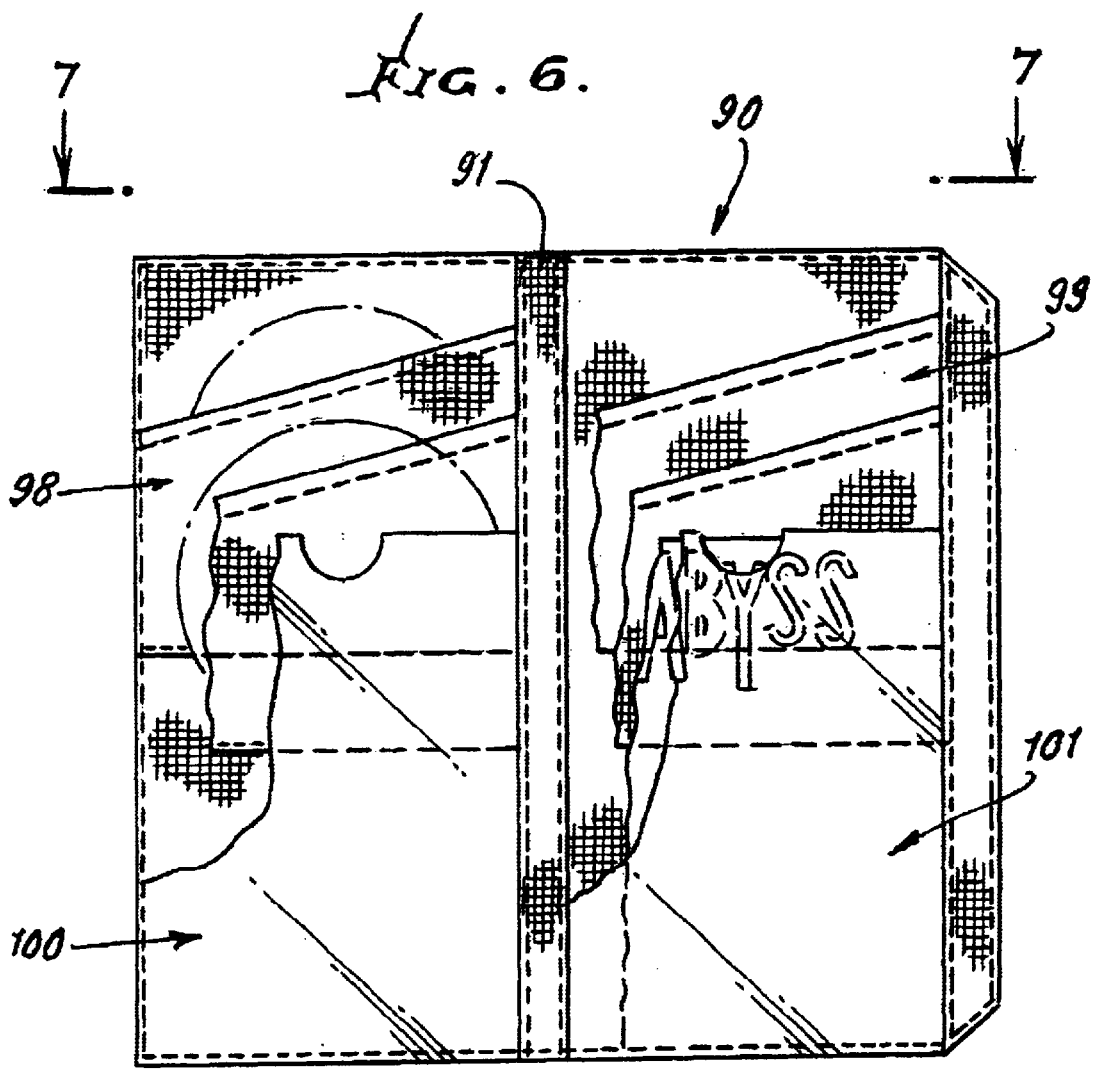
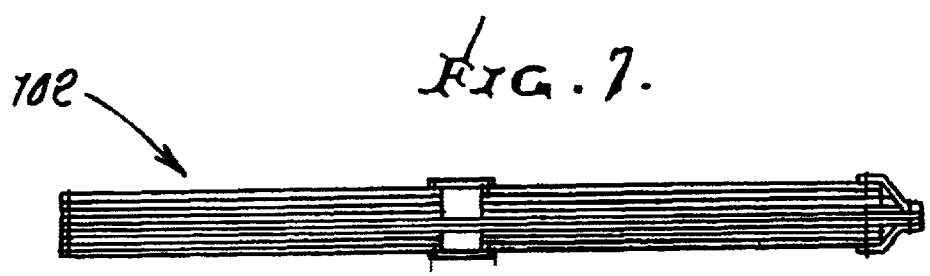

DVD STORAGE ALBUM

BACKGROUND OF THE INVENTION

This invention relates generally to digital video disc (DVD) storage and identification and more particularly to related and convenient storage of both DVDs and identifying printed material.

DVDs are conventionally shipped and stored in thin, square or rectangular, plastic containers, and storage of multiple such containers is inconvenient, particularly where storage space is limited. Printed material identifying said discs is commonly carried at the side of such containers, and commonly extends over a square area substantially exceeding the disc area. Such sizing of the printed material also limits a reduction in storage area.

U.S. Pat. No. 5,590,827 discloses the storage of compact discs in overlapping relation within pockets on a thin support panel. While this manner of disc storage provides considerable convenience, no way was known to fully identify the stored discs in close relation to their storage pockets, without removing the discs from the pockets and examining them.

There is need for improvements in DVD storage in such a way as to provide reduction of storage space, protection of the stored discs, and ready and quick identification of disc data without requiring removing them from storage pockets. The thin plastic containers for such discs may then be disposed of, and storage space for both DVDs and identifying printed or written material may be reduced as well as retained, without jeopardizing use of the discs outside their stored location.

SUMMARY OF THE INVENTION

It is a major object of the invention to provide a solution or solutions to the above discussed problems and disadvantages. Basically, the apparatus of the invention comprises a DVD equipment holder, including a) a backer layer having opposite sides,
  b) first overlapping DVD reception pockets located at one of such sides, and attached to said layer, whereby said pockets have accessible DVD entrances,
  c) and a first transparent plastic layer or layers located at said one side of the backer layer and attached to the backer layer to form a first auxiliary pocket or pockets having an entrance or entrances, whereby a graphics sheet or sheets associated with one or more DVD's is or are receivable in the auxiliary pocket or pockets, and viewable through the first plastic layer or layers.

As will be seen, the auxiliary pocket or pockets typically overlap at least one of the DVD pockets, further condensing the overall storage space available while full storage and identifying functions are retained.

The basic method of providing and using the DVD equipment holder includes a) providing a backer layer having opposite sides,
  b) providing first overlapping DVD reception pockets located at one of said sides, and attached to said layer, whereby the pockets have accessible DVD entrances,
  c) providing a first transparent plastic layer or layers located at said one side of the backer layer and attached to that backer layer to form a first auxiliary pocket or pockets having an entrance or entrances, whereby a graphics sheet or sheets associated with one or more DVD's is or are receivable in said auxiliary pocket or pockets, and viewable through said first plastic layer or layers,
  d) inserting DVDs in the DVD reception pockets,
  e) placing a graphics sheet or sheets in the auxiliary pockets,
  f) viewing said graphics sheet or sheets through said transparent layer or layers, to identify the DVD or DVDs in said first reception pocket or pockets,
  g) and removing an identified DVD or DVDS from said reception pocket or pockets, for use.

Another object of the invention comprise providing second overlapping DVD reception pockets located at an opposite side of the backer layer, and attached to said layers, whereby the second pockets also have accessible DVD entrances. Typically, the second transparent plastic layer is located at the opposite side of the backer layer, and attached to the backer layer to form a second auxiliary pocket having an entrance, whereby another graphics sheet associated with one or more DVDs receivable in said second pockets is itself receivable in said second auxiliary pocket and viewable through the second plastic layer.

Yet another object comprises locating the second DVD pocket entrances in angled relation to the edges of the backer layer and also relative to the entrances to the second auxiliary pockets, to provide further storage compactness, while enabling full accessibility to all pocket entrances.

A yet further object comprises providing at least two such backer layers to fold between open and closed positions, each such backer layer having the two types of pockets, as for DVDs, and for graphics sheets as referred to above.

An additional object is to provide an openable case enclosing a backer layer as referred to, the backer layer having hinge connection to the case.

An added object is to provide at least one transparent plastic layer on one such backer layer and located to protectively overlap facing portions of the DVD discs projecting from DVD pockets on another adjacent backer layer. In this regard, a transparent plastic layer on that other backer layer may protectively overlap portions of the DVD discs projecting from pockets on said one adjacent backer layer.

These and other objects and advantages of the invention, as well as the details of an illustrative embodiment, will be more fully understood from the following specification and drawings, in which:

DRAWING DESCRIPTION

FIG. 4 is a view of the front side of one foldable page as formed by a backer layer, and pockets and contents on one side of the page;

FIG. 5 is an edge view taken on lines 5—5 of FIG. 4;

FIG. 6 is a view of the back side of the FIG. 4 foldable page, and its contents;

FIG. 7 is a diagrammatic edge view of a sequence of backer layers or pages, edge connected to fold in sequence.

DETAILED DESCRIPTION

Figure 1:
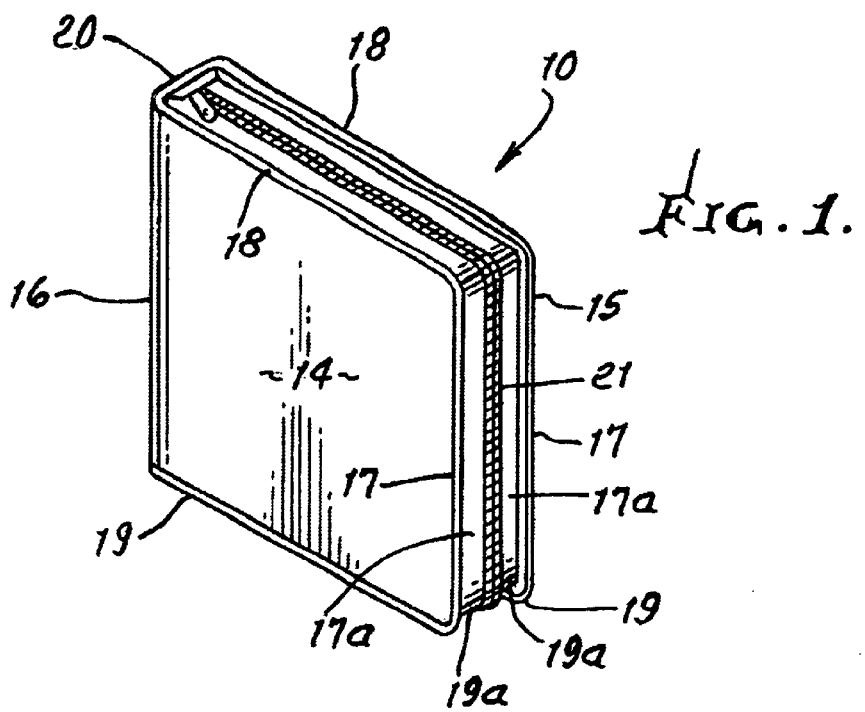
FIG. 1 is a perspective view of a case openable to gain access to DVDs and graphics sheets.
Figure 2:
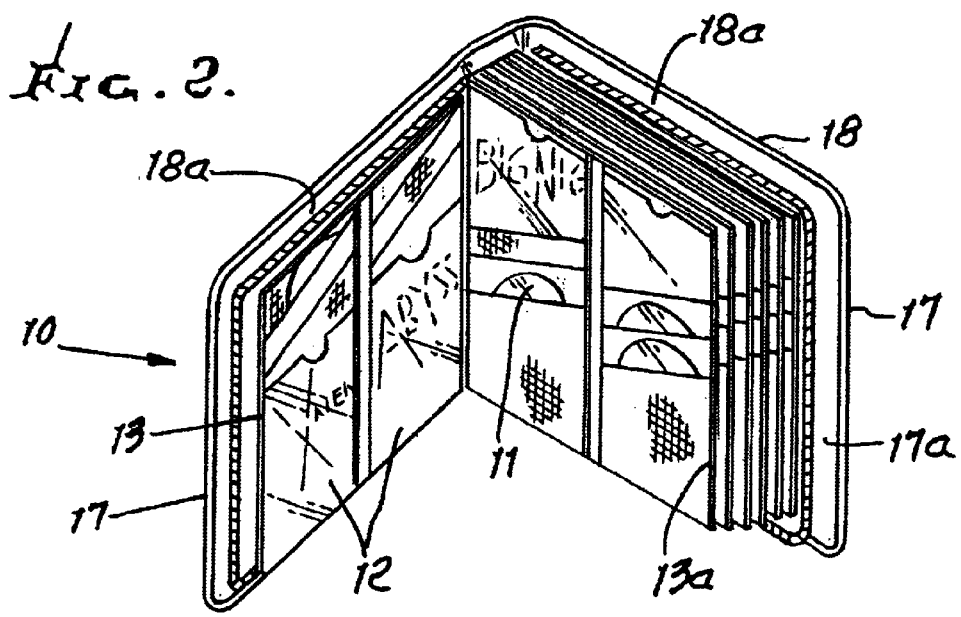
FIG. 2 is a perspective view of the FIG. 1 case after it has been partly opened, and showing DVDs with projecting portions extending in facing protective relation to transparent sheets, as carried by foldable backer layers.

FIGS. 1 and 2 show a case 10 for containing DVDs 11 and transparent sheets 12, on backer layers 13, with associated pockets, all disposed in compact, interprotective relation.

Merely as illustrative, the case includes front and rear panels 14 and 15, with edges as shown; each panel having edges 16, 17, 18 and 19; edges 16 of the two panels interconnected by a web or hinge 20; and each panel having webs 17a, 18a, and 19a projecting sidewardly proximate its edges 17, 18, and 19. A zipper 21 interconnects webs 17a, webs 18a, and webs 19a, as shown, whereby the case may be easily opened, the zipper in FIG. 1 closed condition protecting all the contained backer layers 13, DVD's and transparent sheets 12, and holding the elements in compact, interprotective facing relation as referred to, and as will be more fully referred to below.

As will be seen the device comprises:
- a) a backer layer having opposite sides,
- b) first overlapping DVD reception pockets located at one of such sides, and attached to said layer, whereby said pockets have accessible DVD entrances,
- c) and a first transparent plastic layer or layers located at said one side of the backer layer and attached to said backer layer to form a first auxiliary pocket or pockets having an entrance or entrances, whereby a graphics sheet or sheets associated with one or more DVD's is or are receivable in said auxiliary pocket or pockets, and viewable through said first plastic layer or layers.

Figure 3:
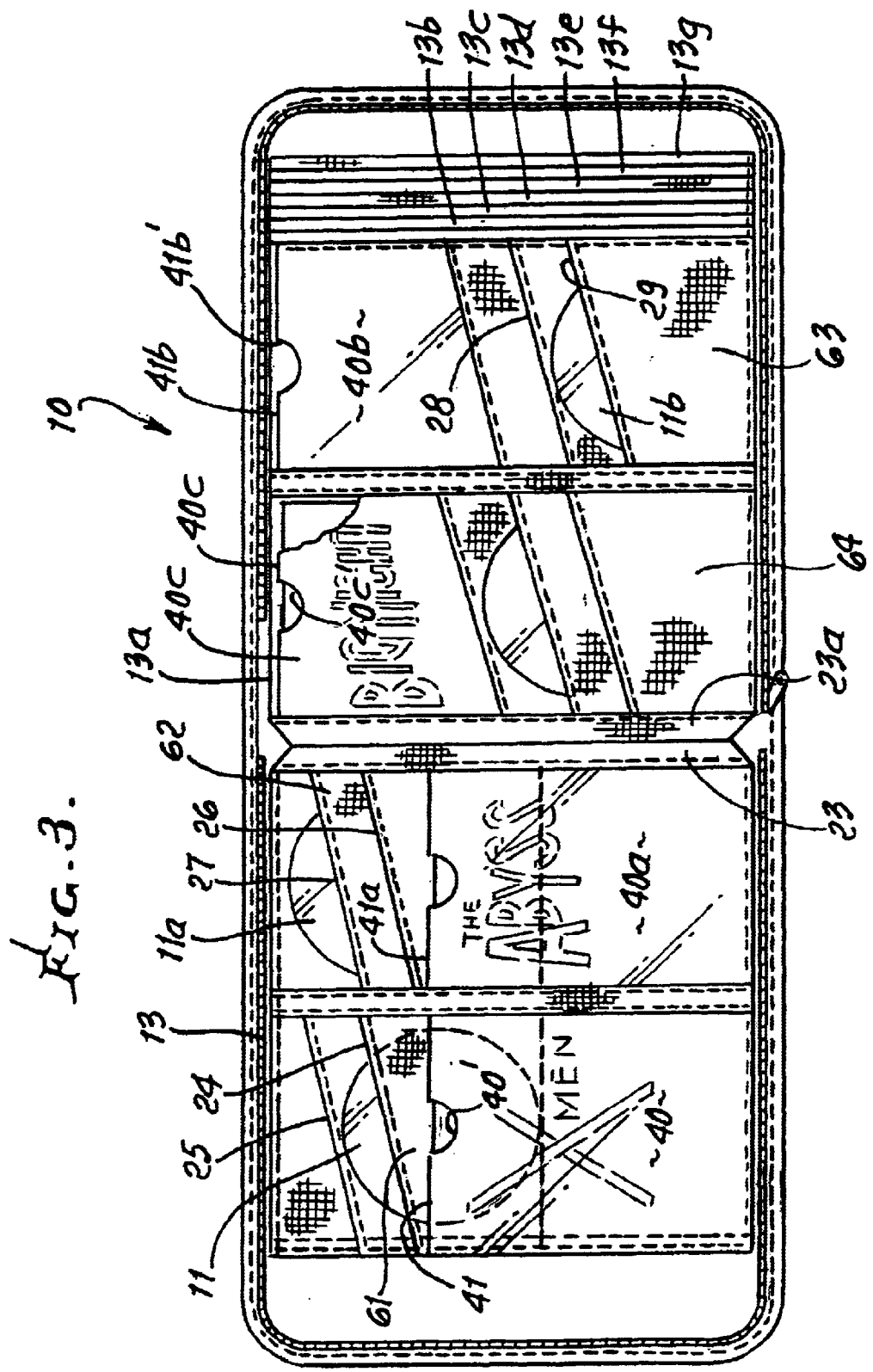
FIG. 3 is an enlarged showing of the FIG. 2 case and its contents, in fully opened position.

Referring to FIGS. 2 and 3, first and second backer layers are shown at 13 and 13a, carried in folding sequence by the case, the fold or hinge locations shown at 23 and 23a. The front side of a backer is shown by the illustrated backer 13a; and the rear side of a backer is shown by the illustrated backer 13. Such front and rear sides, on each backer, are opposite sides. Overlapping reception pockets for DVD's are indicated by their diagonally extending entrances at 24 and 25, and also at 26 and 27, on the backer 13 rear side; and as also indicated by their diagonally extending entrances 28, 29, and 30, and by entrances 31–33, on backer 13a front side. See FIG. 3. Overlapping layers of pocket material appear at 61–64, for example such overlapping layers also existing for all the DVD pockets.

Also provided is a first transparent plastic layer or layers, i.e. sheets, located at said one side of the backer layer and attached to said backer layer to form a first auxiliary pocket or pockets having an entrance or entrances, whereby a graphics sheet or sheets associated with one or more DVD's is or are receivable in said auxiliary pocket or pockets, and viewable through said first plastic layer or layers. See for example transparent layer 40 on backer 13 in downwardly offset relation to pockets 24 and 25. Layer 40 extends over material associated with the backer and forms an auxiliary pocket indicated by its entrance 41, below DVD pocket entrances 24 and 25. A graphics sheet or sheets associated with one or more of the DVD's 11 received in pockets 24 and 25, may be received in the pocket 41, and easily viewed through layer 40 as shown. A similar transparent layer 40a is or may be located on backer 13 in downwardly offset relation to pockets 26 and 27; and layer 40a forms together with the backer material it overlies another auxiliary pocket indicated by its entrance 41a, below DVD pockets 26 and 27. Graphic sheet or sheets associated with DVD's 11a received in pockets 26 and 27, may be easily viewed through layer 40a. Notches 40' and 40a' are found in the upper edges of the auxiliary pockets to provide easily manually gripping access to the graphics sheets.

Also provided is a third transparent layer 40b located on the next backer 13a, in upwardly offset relation to pockets 28–30; and layer 40b forms together with the backer material it overlies a further auxiliary pocket indicated by its entrance 41b spaced above DVD pockets 28–30.

Graphic sheet or sheets associated with DVD's 11b received in pockets 28–30, may be easily viewed through layer 40b. In addition, a fourth transparent layer 40c is or may be located on the front side of backer 13a in upwardly offset relation to pockets 30 and 31; and layer 40c forms together with the material it overlies a yet further auxiliary pocket indicated by its entrance 41c spaced above DVD pockets 30 and 31. Graphic sheet or sheets associated with DVD's 11c received in pockets 30 and 31 may be easily viewed through layer 40c. Note pocket notches 40b' and 40c'.

It will be noted that when backers or backer layers 13 and 13a are relatively closed toward one another, transparent layers 40 and 40a on the rear side of backer 13 will relatively approach and protectively cover the DVD pockets 28–31 and DVD's 11b and 11c therein, on backer 13a; and the transparent layers 40b and 40c on the front side of backer 13a will relatively approach and protectively cover the DVD pockets 24–27, and DVD's therein, on backer 13. This compact, protective relationship is provided by the structure as described and shown. And, it is preferably repeated for successive backers in the case, indicated generally at 13b–13g, in FIG. 3, whereby all received DVD's are protected by facing sheets of transparent plastic material, in closed together condition of the backers in the case.

FIG. 4 is a view of the front sides of foldable page 90, that includes a backer 91, overlapping DVD reception pockets in two lower level rows 92 and 93, and protective transparent plastic layers 94 and 95. FIG. 5 is an end view taken on lines 5—5 of FIG. 4.

FIG. 6 is a view of the back side of foldable page 90, that includes a backer 91, overlapping DVD reception pockets in two upper level rows 98 and 99, and protective transparent plastic layers 100 and 101. The page 90 is incorporated in an assembly of such pages, seen at 102 in FIG. 7.

We claim:
1. DVD equipment holder comprising in combination:
- a) two backer layers that are interconnected to fold between open and closed position, each backer layer having opposite sides,
- b) first overlapping DVD reception pockets located at a relatively lower region of the backer layer at one of said sides, and attached to said layer, whereby said first pockets have accessible lower DVD entrances, and second overlapping DVD reception pockets located at a relatively upper region of the backer at a second and opposite of said sides, and attached to said layer, whereby said second pockets have accessible upper DVD entrances,
- c) and a first transparent plastic layer or layers located at said one side of the backer layer and attached to said backer layer to form a first auxiliary pocket or pockets having a relatively upper entrance or entrances, whereby a first graphics sheet or sheets associated with one or more DVD's is or are receivable in said first auxiliary pocket or pockets, and viewable through said first plastic layer or layers, and a second transparent layer or layers, located at said second side of said backer layer and attached thereto to form a second pocket or pockets having a relatively lower entrance or entrances whereby a second graphics sheet or sheets associated with one or more DVDs is or are receivable in said second auxiliary pocket or pockets and viewable through said second plastic layer or layers,
- d) said first transparent layer being in registration with said second DVD reception pockets,
- e) and said second transparent layer being in registration with said first DVD pockets.

2. The combination of claim 1 including DVD discs received in said DVD pockets, a graphics sheet received in said first auxiliary pocket, and an openable case enclosing said backer layer, said DVD discs, and said graphics layer, said backer layer having hinge connection to said case.

3. The combination of claim 1 including DVD discs received in said DVD pockets on both said backer layers, graphics sheets received in said auxiliary pockets on both said backer layers, at least one said plastic layer on one said backer layer protectively overlapping facing portions of the DVD discs projecting from DVD pockets on the other said backer layer.

4. The combination of claim 3 wherein a plastic layer on said other backer layer protectively overlaps portions of DVD discs projecting from pockets on said one adjacent backer layer.

5. The combination of claim 3 including a case receiving all said backer layers, DVD discs and transparent plastic layers, said backer layers having hinge connection to said case to be individually rotatable when the case is opened.

6. The method of providing and using a DVD equipment holder that includes:

a) providing a backer layer having opposite sides, b) providing first overlapping DVD reception pockets located at a relatively lower region of the backer layer at one of said sides, and attached to said layer, whereby said first pockets have accessible lower DVD entrances, and second overlapping DVD reception pockets located at a relatively upper region of the backer at a second and opposite of said sides, and attached to said layer, whereby said second pockets have accessible upper DVD entrances, c) providing a first transparent plastic layer or layers located at said one side of the backer layer and attached to said backer layer to form a first auxiliary pocket or pockets having a relatively upper entrance or entrances, whereby a graphics sheet or sheets associated with one or more DVD's is or are receivable in said first auxiliary pocket or pockets, and viewable through said first plastic layer or layers, and providing a second transparent layer or layers, located at said second side of said backer layer and attached thereto to form a second pocket or pockets having a relatively lower entrance or entrances whereby a second graphics sheet or sheets associated with one or more DVDs is or are receivable in said second auxiliary pocket or pockets and viewable through said second plastic layer or layers, d) said first transparent layer being in registration with said second DVD reception pockets, e) and said second transparent layer being in registration with said first DVD pockets, f) inserting DVDs in said DVD reception pockets, g) placing a graphics sheet or sheets in said auxiliary pocket or pockets, h) viewing said graphics sheet or sheets through said transparent layer or layers, to identify the DVD or DVDs in said first reception pocket or pockets, i) and removing an identified and selected DVD or DVDs from said reception pocket or pockets, for use.

* * * * *